United States Patent [19]

Schlegl

[11] Patent Number: 4,842,346
[45] Date of Patent: Jun. 27, 1989

[54] CHAIN TRACK

[75] Inventor: Eugen Schlegl, Groebenzell, Fed. Rep. of Germany

[73] Assignee: Krauss-Maffei A.G., Fed. Rep. of Germany

[21] Appl. No.: 8,834

[22] Filed: Apr. 21, 1987

Related U.S. Application Data

[63] Continuation-in-part of Ser. No. 763,688, Aug. 8, 1985, abandoned.

[30] Foreign Application Priority Data

Aug. 8, 1984 [DE] Fed. Rep. of Germany ....... 3429171
Feb. 7, 1986 [DE] Fed. Rep. of Germany ....... 3603933

[51] Int. Cl.$^4$ .............................................. B62D 55/24
[52] U.S. Cl. .................................. 305/38; 305/35 EB
[58] Field of Search ............ 305/38, 35 EB, 42, 58 R, 305/58 PW; 198/847

[56] References Cited

U.S. PATENT DOCUMENTS

| | | |
|---|---|---|
| 1,774,815 | 9/1930 | Robertson . |
| 1,949,423 | 3/1934 | Knox et al. ........................... 305/38 |
| 2,494,065 | 6/1944 | Slemmons . |
| 2,914,360 | 11/1959 | Duclot . |
| 3,622,209 | 11/1971 | Leyden . |
| 3,700,287 | 10/1972 | Persin ................................... 305/38 |
| 4,165,092 | 3/1979 | Kasin . |
| 4,407,550 | 10/1983 | Lapsys .................................. 305/38 |

FOREIGN PATENT DOCUMENTS

| | | |
|---|---|---|
| 1024381 | 1/1954 | Fed. Rep. of Germany . |
| 726522 | 5/1932 | France . |
| 0003737 | 1/1979 | Japan .................................... 305/38 |

*Primary Examiner*—James B. Marbert
*Attorney, Agent, or Firm*—Robert J. Koch

[57] ABSTRACT

A chain link of a chain track is penetrated at its joints to adjacent chain links by bolts, for example connector bolts or hinge bolts. The chain links are connected in a positive and frictional manner. The chain link may be made of elastomeric material in which flexible, high tensile filaments are embedded. The filaments may be wound back and forth between the two joining locations and loop around the cross-sectional surfaces of the bolts (connector bolts or hinge bolts) located at the joining locations, in alternating directions. A chain track assembled from individual chain link elements may have individual chain link elements including a shear field support of one or more layers of readily bending steel foil, surrounded on both sides by elastomeric material. The layer or layers of steel foils are clamped at the two joint locations of adjacent chain link elements between a transverse web and a clamping bar, with the chain links connected to one another by threaded fasteners. The shear field support is tensioned between the transverse web and the clamping bar and a space filled with an elastomeric material is provided between the side which faces away from the transverse web of the clamping bar and the shear field support for achieving a greater loading and a longer serviceable life of the endless chain track.

28 Claims, 12 Drawing Sheets

CHAIN TRACK

This is a continuation-in-part of U.S. application Ser. No. 763,688, filed 8/8/85, now abandoned.

BACKGROUND OF THE INVENTION

1. Field of the Invention

The invention relates to a chain track and more particularly to a chain track, penetrated at its joining locations with the adjoining links by connecting bolts or hinge bolts, whereby the chain links may be joined together positively or frictionally. The invention further relates to a chain link with connecting points to adjacent links. Each link includes a rigid steel transverse web arranged for connecting adjacent link elements. A shear field support, preferably made of one or more flexible high strength steel foils is connected to and runs between the transverse webs of each element. The shear field support is connected to the transverse web with a clamping bar. The link elements further comprise elastomeric material.

2. Description of the Prior Art

A chain track is known from West German Patent Application No. 27 06 891, the chain links whereof consist of an elastomeric material and in which between the joints with the successive chain links a wire rope loop is embedded.

This layout has the disadvantage that the entire chain tensile force to be transmitted is concentrated on the two wire rope strands, whereby the areas of elastomeric material located between the wire rope strands are not rigidizing and therefore require the application of additional reinforcements, such as for example core inserts. The transmission of transverse forces is possible to a limited extent only.

A chain track is further known from West German Application No. 26 14 963, the chain links of which consist of an elastomeric material and which include in their joints with the successive chain links, steel studs that may be connected with the studs of successive chain links rigidly and positively, the chain links between the transverse studs consist of an elastomeric material into which the round steel chain links are vulcanized.

The round chain links are embedded in the rubber material. They are under tensile stress and constant bending and exposed to frictional wear which limits the life of the chain. In the area of the round chain links the rubber is exposed to strong flexing, potentially leading to premature aging of the rubber material.

The area of the chain links between the transverse studs is not suitable for the transmission of transverse forces, as this requires specially designed chain guide teeth.

SUMMARY OF THE INVENTION

It is an object of the invention to provide a chain track with the properties of an endless chain without links or an undivided belt track composed of replaceable chain links and capable of absorbing transverse forces.

Chain tracks of this type provide the particular advantage that the polygon effect and the associated generation of strong vibrations resulting from the contact of rigidly mounted chain links with the wheels of the running gear of tracked vehicles is extensively reduced. A high transverse stability is obtained with chain links made of an elastomeric material with readily bending steel inserts, without the need for special measures, such as for example interlocking chain guide teeth as in West German Application No. 26 14 963.

By means of filaments wound in the forms of a figure eight around the cross-sectional surfaces of the two bolts, the differential elongation occurring between the upper and lower halves is compensated, whereby the introduction of additional forces due to bending is avoided and no relative movements take place between the filaments and the surrounding elastomeric material, which could lead to flexing stresses and consequently to premature aging. The uniform distribution of filaments between the force introduction elements eliminates the need for additional supporting fabrics.

In an embodiment, the filaments taken back and forth between the two joints are wound obliquely to the longitudinal direction of the chain link, so that they cross each other in the center of the chain link. The chain link is capable of standing up to high transverse forces as a result of the high transverse rigidity obtained by the effect of the supporting fabric winding.

Sleeves are vulcanized into the elastomeric material at the joints, in which the connecting or hinge bolts are supported fixedly in rotation. In both connector chains and hinged chains, the bolts are located fixedly with respect to rotation in the sleeves, whereby the chain links are made to rest against each other without gaps. The tight fit of the chain links, made substantially of an elastomeric material, creates an elastically bending elastomeric belt chain, which is almost without elongation in the tensile direction and which in comparison with chains with endless chain divisions generate only slight vibrations due to contact with the running gear and the impact with the links in the gaps. In the case of hinged chains, the joining of the chain links is accomplished by means of hinged closures, the sleeves are arranged with interruptions which are engaged by corresponding interruptions of the connecting chain links.

In a further embodiment, in the joining plane between the axial lines of the bolts bearingly supportable in both of the joint locations, a shear field support is arranged with one or several layers made of a material that is flexible in bending and rigid in shear and has a high tensile strength. For example, one or several foils of a spring steel welded at their edges to the sleeves are suitable for this purpose. The foil and the sleeves may comprise a single drop forging. The foil may further be perforated, in order to improve the embedding of the foil material in the elastic material.

To increase the rigidity of the chain link under stresses causing it to bend around its longitudinal axis, both above and below the shear field support or the foil, one or several support layers may be arranged spaced apart in the elastomeric material, said support layers being corrugated in the running direction and comprising a readily bendable material such as a spring steel. The elongations resulting from the bending of the chain link around its transverse axis, for example upon its entering the deflection pulley, on the upper side, and the compression on the bottom side, are compensated by the corrugation of the support layer.

In a further embodiment the chain link is provided, in its joints with the adjacent chain links, with rigid transverse steel studs which may be rigidly and positively connected with the transverse studs of a successive chain link. The transverse studs of a chain link being combined in a single piece with the shear field support made of a readily bending material that is rigid in shear and has a high tensile strength, such as a flat piece of a spring steel.

The elastomeric material of the tightly fitting chain links extends past the transverse studs and consequently the connecting bolts are located deeper.

The shear field supports are corrugated in the peripheral area orifices provided for the engagement of the drive gears, in order to compensate in these locations for the increased elongation caused by the introduction of force through the transverse studs.

In an embodiment of a chain link with transverse studs and with bending elements made of a high tensile steel placed between them in the neutral fiber, with latter may consist of several layers of a thin spring steel foil. In this manner, the transverse studs of a chain link are connected by means of a shear field support having a high reversing bending fatigue stress and being capable of absorbing transverse forces. The shear stress supports, composed of thin foil, are fastened to the transverse studs by clamping strips.

Further, according to the invention, the endless chain track is assembled from individual chain link elements which have sufficient flexural properties. An object of the invention is to provide an endless chain track which can be subjected to higher loads and will have a longer operational life.

According to a particularly advantageous embodiment, to increase load capability and operational life, elastomeric material is enclosed or may extent between the shear field support and the clamping bar, and clamped portion of the shear field support.

In the endless track according to the invention with intermediate elastomeric material, the force input to the shear field support from the clamping location at the transverse webs is for tensile loads as well as the constantly present buckling and bending loadings.

Advantageously, the intermediate elastomeric material is arranged in a narrowing gap, disposed between a shear field support and a clamping bar so as to achieve a very favorable normalization of forces introduced into the shear field support.

It is also advantageous that the elastomeric material filled gap is configured in such a way that the shear field supports are generally arranged in the same plane, wherein tensile forces can be transferred in the chain in a continuous line without offset. Introduction of tipping moments is avoided because sharp buckling lines do not arise, by way of offset force line flow, into the connection locations of the chain link elements.

It is further advantageous to prove support pieces in the edge zones which are reinforced with flexible shear field support made of steel foils in order to prevent excessive buckling or collapse in the edge zones of the edge regions of the elastomeric chain link elements upon traversing rock pieces and the like.

The elastomeric material may extend into a gap defined by the outer side of the clamping bar and the shear field support. The gap narrows towards the guide edge of the clamping bar neighboring the adjacent chain link element. Each shear field support may advantageously be covered on the side facing away from the gap with a layer of elastomeric material.

The shear field supports of adjacent chain link elements are arranged approximately in the same plane, whereby neighboring shear field supports, at the connection points, are guided with oppositely arranged inclining contours in the gap formed between transverse webs and the clamping bar. A support element to prevent collapse of the chain may be secured at the connection points of adjacent chain links at the two outer edge zones of the inner running surfaces for chassis wheels. The support piece may be comprised of a disc segment centrally secured at the transverse webs. A curved contact roll surface of each support is directed towards the inner running surface and has a radius of curvature which may be smaller than or equal to the radius of the chassis wheels. A gap defined between the inner running surface and the curved roll surface of the disc segment may be covered by a rubber cover.

The support pieces may be one or more leaf springs secured at the transverse webs and in contact and connected to the inner running surface of the track. The leaf springs may be in a pack where the length of each successive spring is shorter as its distance from the inner running surface increases.

Each transverse web of a chain link segment may include bolt-like extensions which extend over the lateral edge of the chain link element. A protective tie may be secured to the extensions at least at one lateral edge of the chain link element.

Certain examples of embodiments of the invention are described below in more detail with reference to the drawings.

DETAILED DESCRIPTION OF THE PREFERRED EMBODIMENT

Figure 1:
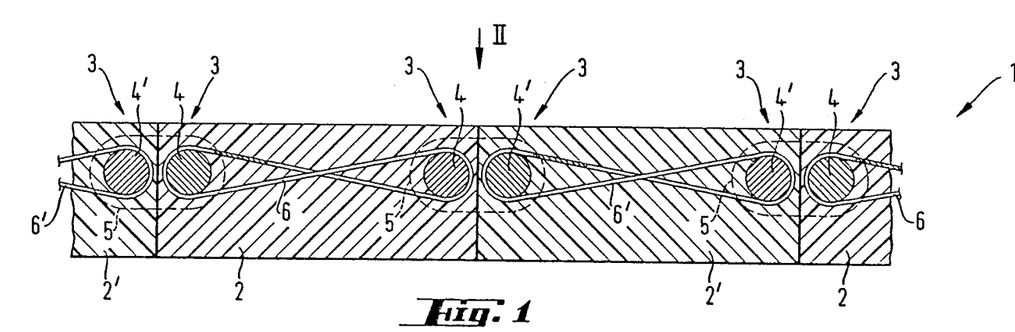
FIG. 1 shows a plurality of chain links of a connector chain according to the I—I section line in FIG. 2.
Figure 2:
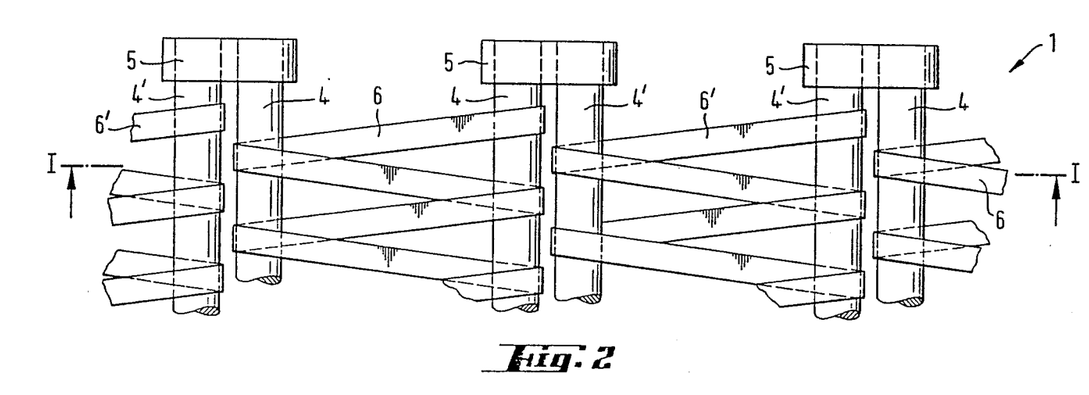
FIG. 2 shows a top view of the chain links according to FIG. 1 with the winding layout of the filaments woven into belts.

The chain track 1 shown in FIGS. 1 and 2 represents a connector chain in which the individual chain links 2 and 2' are penetrated at the joints 3 by connecting bolts 4 and 4' laterally protruding past the chain links 2 and 2', with the protruding parts of the connecting bolts 4 and 4' of two adjacent chain links 2 and 2' being joined together by a connector 5.

The chain track 1 is placed into engagement with the rim of the driving gear of the tracked vehicle.

The chain links 2 and 2' consist of an elastomeric material, for example rubber, are laid out with respect to each other so that they are in contact without gaps. The connecting bolts are vulcanized fixedly with respect to rotation into the chain links 2 and 2'. They may also be supported fixedly in rotation in a sleeve (not shown) embedded in the chain link 2 and 2'.

Belts 6 and 6', woven of high tensile filaments, are passed between the two connecting bolts 4 and 4' to and from in a manner such that they are looped in alternating rotating directions around the cross-sectional surfaces of the connecting bolts 4 and 4' inserted in the two joint locations 3. Similarly, in an embodiment equipped with sleeves (not shown) the belts are looped around the sleeves. The belts 6 and 6' represent, as shown in FIG. 1 the shape of a figure 8, whereby it is assured that the elongations and compressions occurring in the upper and lower area of a chain link during the bending of the chain link mutually compensate each other. Relative movements between the filaments or belts and the surrounding elastomeric material are extensively reduced so that no excessive flexing, potentially leading to premature aging, may take place.

Figure 3:
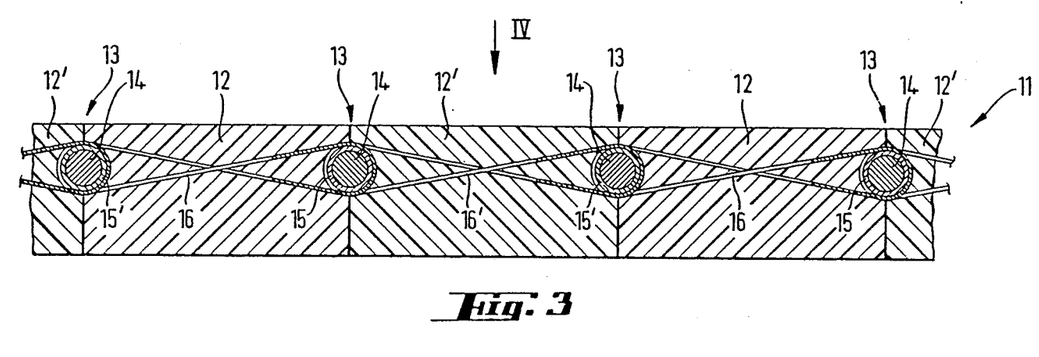
FIG. 3 shows a plurality of chain links of a hinged chain according to the III—III section in FIG. 4.
Figure 4:
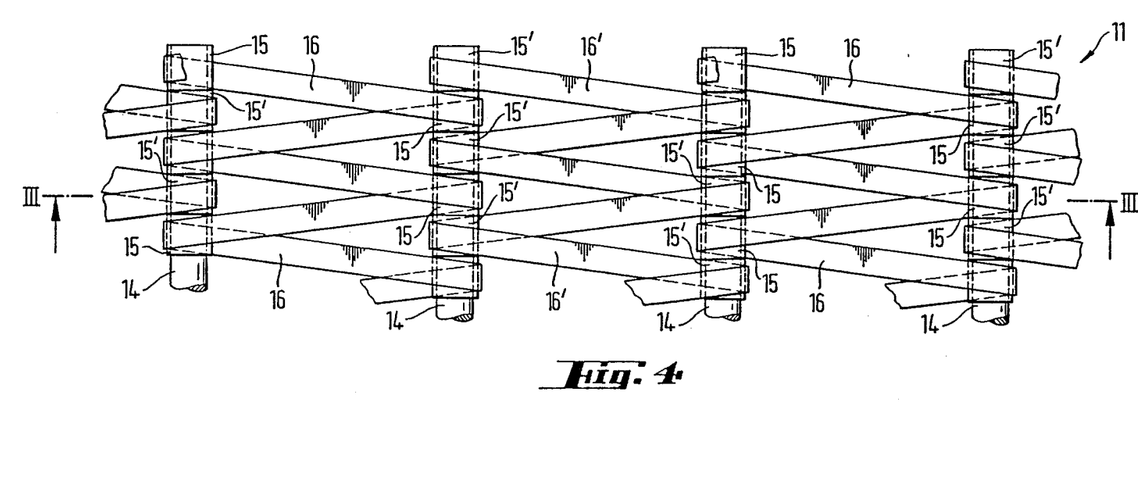
FIG. 4 shows a top view of the chain links according to FIG. 3, with the winding layout of the filaments woven into belts.

The chain track 11 shown in FIGS. 3 and 4 represents a hinged chain, in which the individual chain links 12 and 12' are provided with a common hinge bolt 14 at their joint locations 13 with alternating recesses and projections which engage each other. The hinge bolts are supported fixedly with respect to rotation in sleeves 15 and 15', with the sleeves 15 being vulcanized into the chain link 12 and the sleeves 15' into the chain link 12'. The sleeves 15 and 15' are looped around by belts 16 and 16' woven of high tensile filaments. The chain links 12 and 12' consist of an elastomeric material, into which the webs 16 and 16' are vulcanized. The chain links 12 and 12' fit together with gaps.

Figure 5:
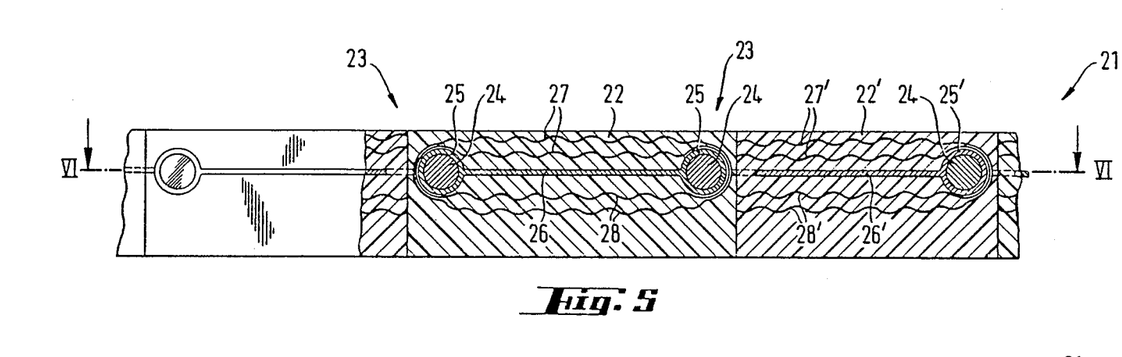
FIG. 5 shows a plurality of chain links of a different form of embodiment of a hinged chain according to the section V—V in FIG. 6.
Figure 6:
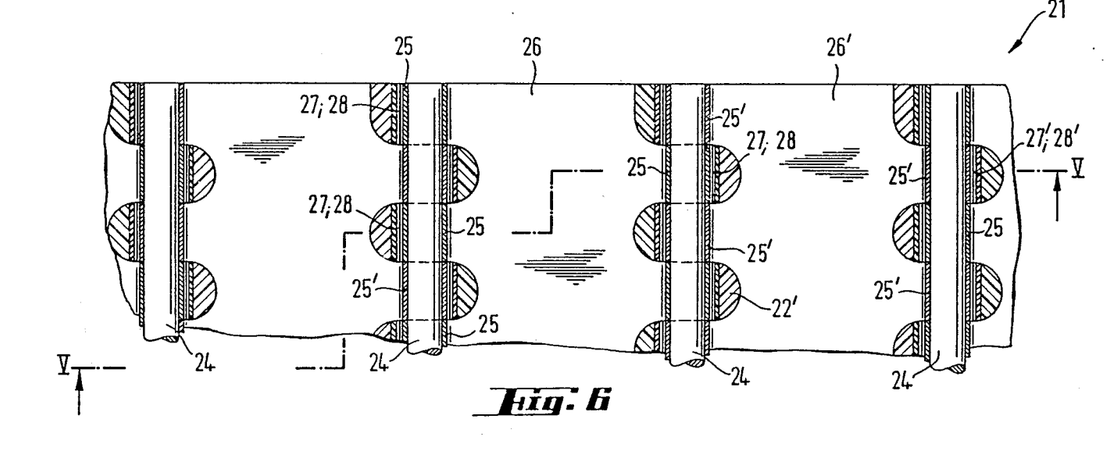
FIG. 6 shows a view of the chain links according to the section VI—VI in FIG. 5.

The chain track 21 shown in FIGS. 5 and 6 represent another embodiment of a hinged chain, wherein the individual chain links 22 and 22' are provided at their joint locations 23 with recesses and projections engaging each other in the manner of hinges and penetrated by a common hinge bolt 24. The hinge bolts are supported fixedly with respect to rotation in sleeves 25 and 25', vulcanized into the elastomeric material of the chain links 22 and 22. The sleeves, composed of individual parts, of a chain link are interconnected in the connecting plane between the axial lines of two hinge bolts in single piece with a shear field support 26 and 26' made of readily bending material which is rigid in shear, for example a spring steel foil. The sleeves and the shear field supports may consist of a single piece, for example a drop forging, the sleeves may further be welded to the shear field support or the shear field support may have a sleeve-like configuration at the joint locations.

Spaced apart from the shear field support 26 and 26' in a parallel manner, on the upper and the lower side, two support layers 27 and 27' and 28 and 28' are vulcanized into the elastomeric material of the link chains 22 and 22', with the upper and lower support layers being connected with each other, after looping around the sleeves.

The support layers 27 and 27' and 28 and 28' are provided with corrugations running transversely to the longitudinal axis of the chain, as seen in FIG. 5. As a result of the higher moment of inertia due the corrugated structure, the support layers are rendered flexible in a bending axis aligned transversely to the longitudinal axis of the chain and possess high rigidity in a bending axis extending in the longitudinal axis of the chain. By virtue of the corrugated structure, the elongations and compressions occurring in the course of bending transversely to the longitudinal axis of the chain of the support layers may be compensated for without the generation of strong resistance forces.

Figure 7:
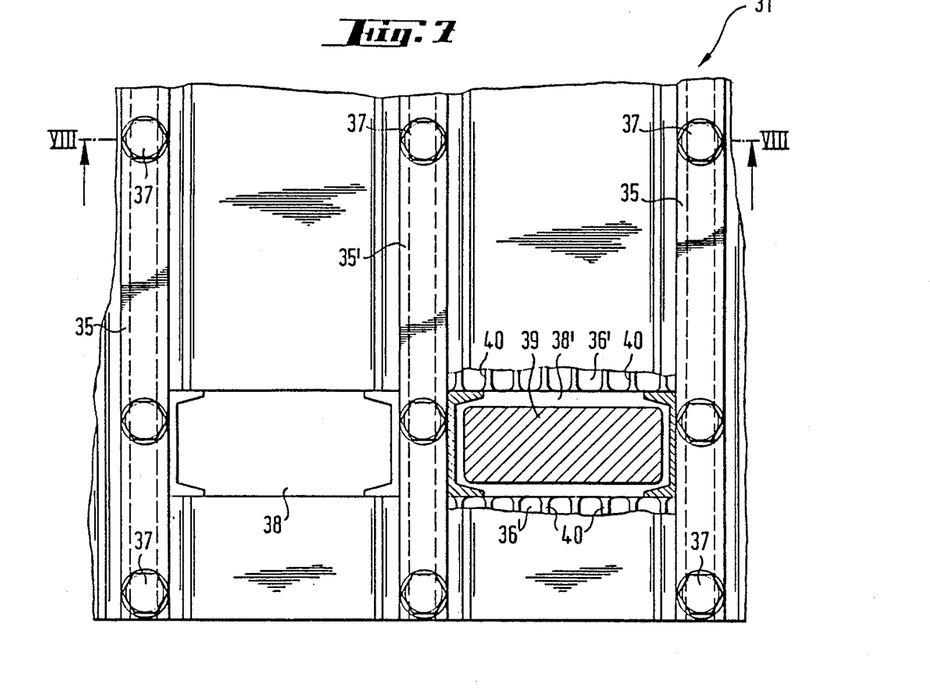
FIG. 7 shows a partial segment of a further form of embodiment of a chain track with recesses for the engagement of the teeth of the drive wheel.
Figure 8:
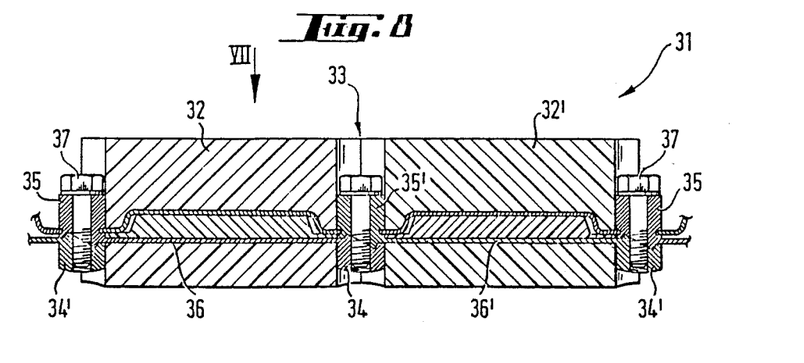
FIG. 8 shows a lateral elevation of the chain track according to the section VIII—VIII in FIG. 7.

The chain track 31 shown in FIGS. 7 and 8 comprise the chain links 32 and 32', which at the joint locations 33 may be coupled together by means of transverse studs 34 and 35 and 34' and 35'. The transverse studs of the chain links 32 and 32' are interconnected as a single piece by means of the shear field supports 36 and 36'. The transverse studs 34 and 35' have interconnecting grooves, whereby the transverse studs may be interconnected positively by means of bolts 37.

The transverse stud are embedded into the elastomeric material of the chain link 32 and 32', which further is protruding past the bolts 37 and is resting without gaps against the adjacent chain link.

The chain links 32 and 32' have orifices 38 and 38', which are engaged by the teeth 39 of the drive wheels. At the peripheral areas of said orifices the shear field supports 36 and 36' have corrugations 40 extending transversely to the longitudinal direction of the chain, whereby localized stress peaks to the introduction of forces are compensated by the greater ductility of the peripheral areas.

Figure 9:
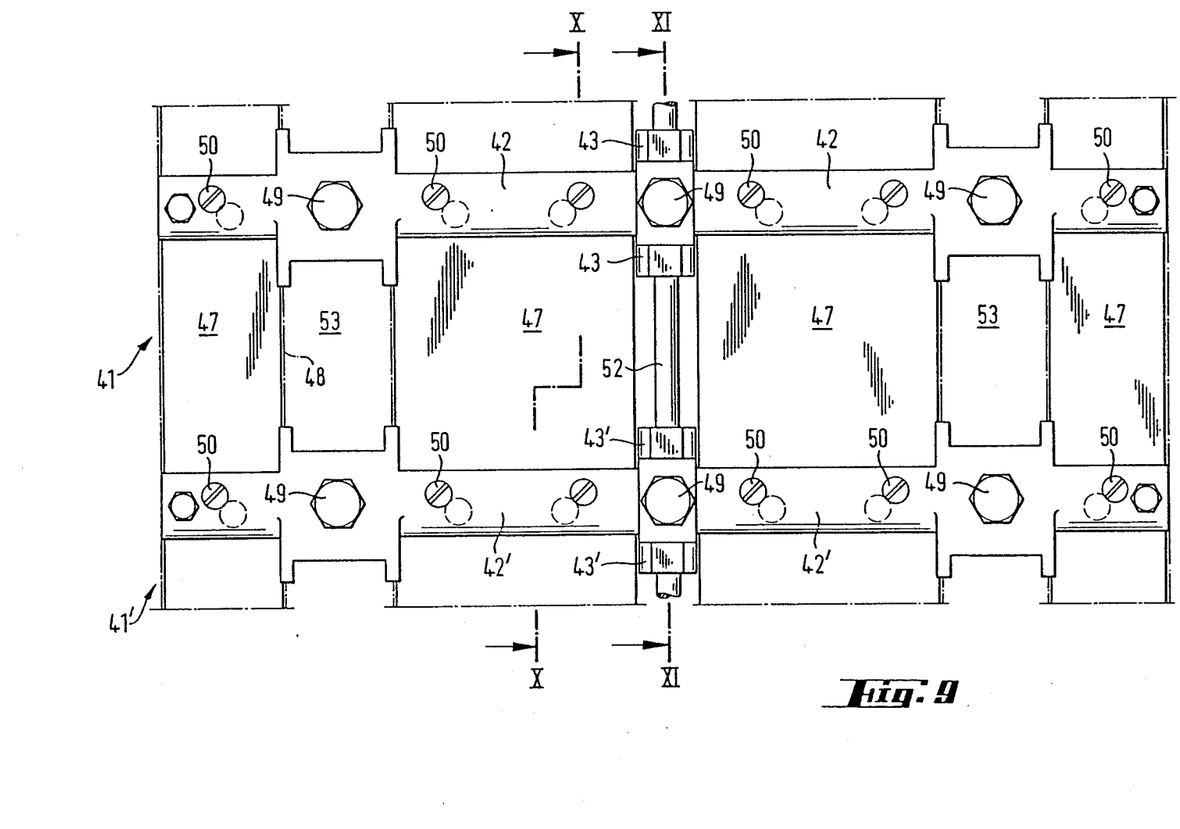
FIG. 9 shows a chain link of a further form of embodiment in a top view of the running surface passed over by the running wheels.
Figure 10:
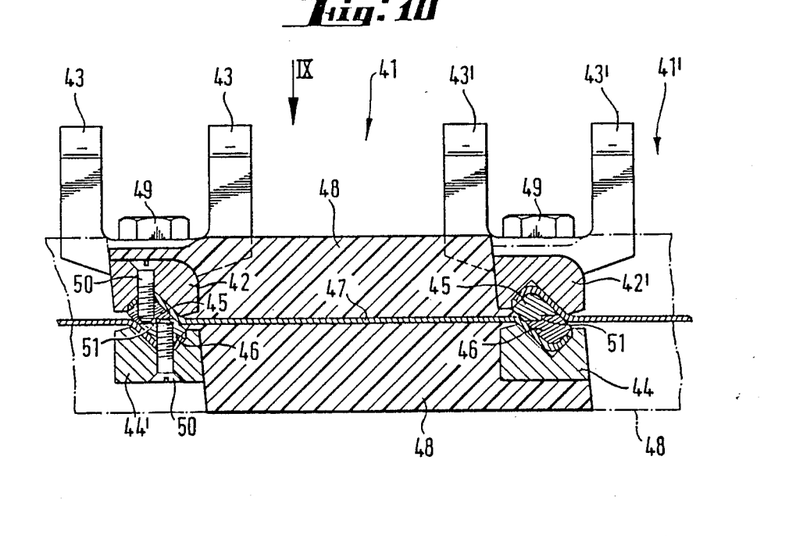
FIG. 10 shows a sectional view of the chain link according to the section X—X in FIG. 9.
Figure 11:
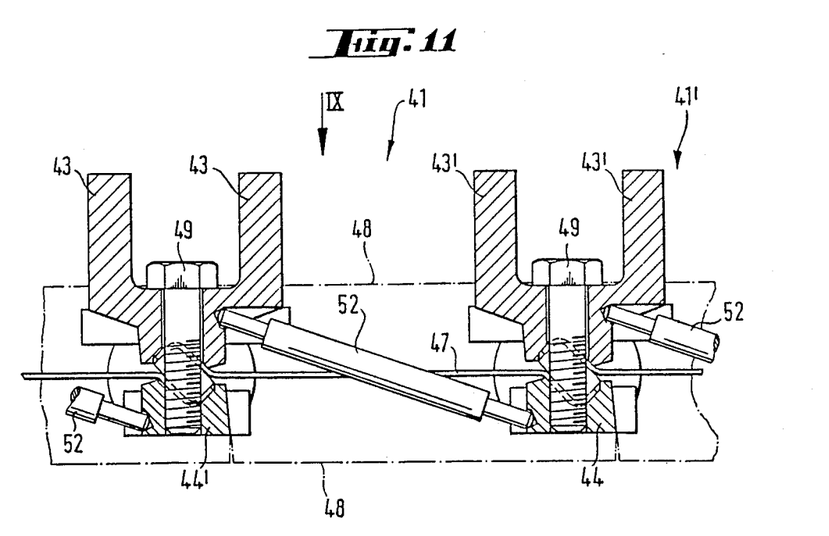
FIG. 11 shows a sectional view of the chain link according to the line XI—XI of FIG. 9.

The chain track shown in FIGS. 9 to 11 comprise identical chain links 41 and 41', with FIG. 10 indicating the outline of a chain link by heavy solid lines. Each chain link 41, 41' is equipped with two transverse studs, with one of the transverse stud 42, 42' being assigned to the running surface passed over by the track rollers and carrying the chain guide teeth 43, 43'. The other transverse stud 44, 44' is associated with the bottom side of the chain track. Each of the transverse studs 42 and 44 is provided with a clamping strip 45 and 46, whereby a shear field support 47 consisting of several thin foils of a spring steel is solidly connected with the transverse studs 42 and 44. The shear field support 47 is located in the neutral fiber of the chain link and is surrounded on both sides by the elastomeric material 48. The transverse studs are covered both on the running surface passed over by the track rollers of the tracked vehicle and on the bottom side of the chain track with an elastomeric material. The transverse studs 42 and 44' and 42' and 44, respectively, are connected with each other by the bolts 49, located in the areas of the chain track not passed over by the track rollers. The clamping strips 45 and 46 are connected by separate bolts 50 with the transverse studs 42, 42' and 44, 44' and having locking edges 51, which together with the locking edges of the clamping strip of the transverse stud of the adjacent chain link, provide a solid, positive joint capable of withstanding high tensile forces. It is particularly advantageous, as shown in FIG. 10, to anchor the clamping strips obliquely to the direction of the chain tension in the transverse studs, in order to obtain the largest possible surface area for the frictional lock between the clamping strip and the transverse stud on the one hand, and the shear field support on the other. A particular advantage may be seen in that the locking edges are laid out so that they are exposed to compressive stresses when the chain track is under tensile stress.

Between the transverse stud 42 equipped with chain guide teeth 43, 43' and the transverse stud 44, a push rod 52 (FIG. 11) is arranged, which in the case wherein the chain guide teeth 43 slip from the guide groove of the running wheel and are rolled over by the running surface of the running wheel, prevents the excessive buckling of the chain links in the flexible areas between the transverse studs.

A plurality of orifices 53 (FIG. 9) is provided for the engagement of the teeth of the drive gears.

The following description references FIGS. 12 through 18.

The endless track assembly as shown in FIGS. 12–18 has identical chain link elements 101, 101' which have inner running surfaces 102, 102' on which the track rollers (not shown) roll, and outer running surfaces 102, 102' on which the track rollers (not shown), and outer running surfaces 103, 103' directed towards the ground. In accordance with the embodiment of FIG. 12, each chain link element 101 and 101' carries two transverse webs 104 and 105, as well as 104' and 105', respectively. The transverse webs 104 and 104' are associated with the inner running surfaces 102 and 102' and the transverse webs 105 and 105' are respectively associated with the outer running surfaces 103 and 103'. Each transverse web 104, 105, 104', 105', respectively, is equipped with a clamping bar 106 and 107, 106' and 107', respectively, by with a shear field support 108 and 108', respectively, is fixedly secured to the transverse webs 104 and 105. A shear field is made up of one or more thin foils of spring steel. Shear field support 108' is correspondingly secured to the transverse webs 104' and 105', respectively. The shear field support 108, and 108', respectively, is arranged in the neutral fiber or seam of the chain link element, surrounded on both sides by an elastomeric material 109, and 109' respectively. The shear field support 108 of the chain link element 101 is clamped on one side between the transverse web 104 and the clamping bar 106 and on the other side between the transverse web 105 and the clamping bar 107. In this way, the chain link element represents a unitary component which can be assembled into an endless chain track by way of threaded fasteners (not shown) of the transverse web 104, 105 to the transverse webs 105' and 104' of the adjacent chain link elements 101.

Figure 13:
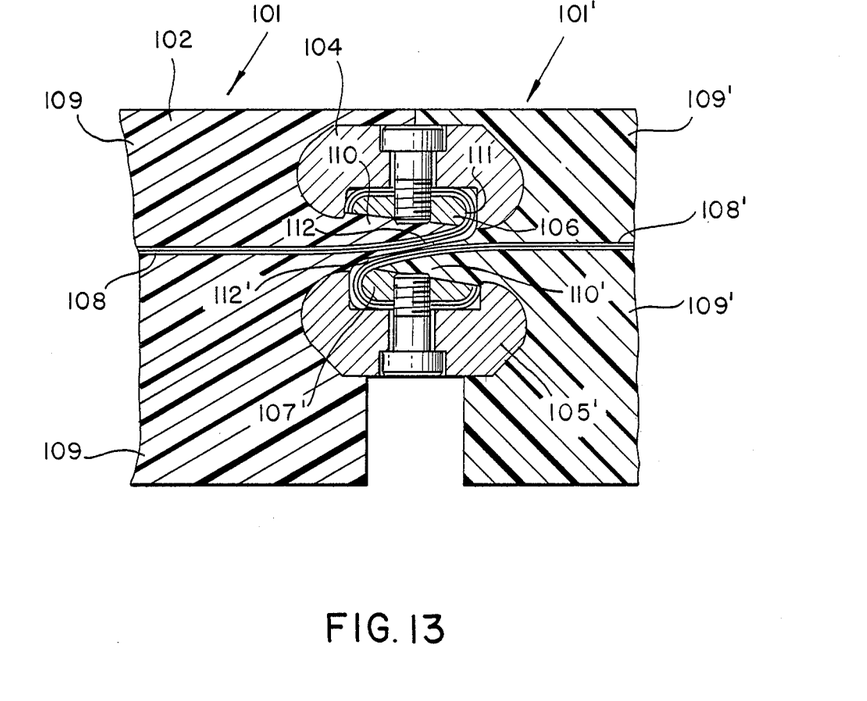
FIG. 13 shows the connection location between two chain link elements according to FIG. 12 in a larger scale.

There is a gap 110 defined between the side facing away from the transverse web 104 of the clamping bar 106 and the shear field support, which is filled with elastomeric material 109, as shown particularly in FIG. 13. This gap 110 tapers or thins in the direction of the guide edge 111 of the clamping bar directed towards the neighboring chain link element 111'. The shear field support 108 is covered by a layer 112 of elastomeric material 109 on the side facing away from the gap 110. The shear field support 108 is upwardly inclined over the length of the gap 110. The shear field support 108' of the succeeding chain link elements 101' is secured similarly in mirror image reversal, and the individual components thereof which are similar indicated by reference numerals with an index apostrophe (').

Figure 12:
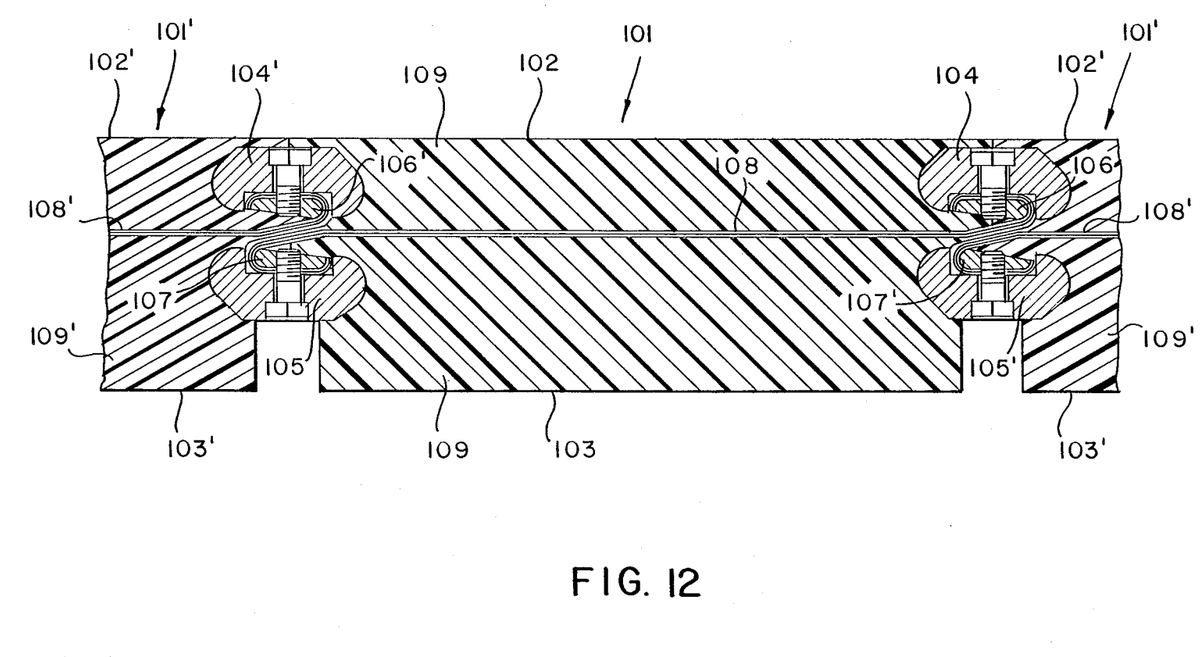
FIG. 12 shows a longitudinal section through a chain link element and through the adjacent portions of the two neighboring chain link elements of an endless chain track.
Figure 14:
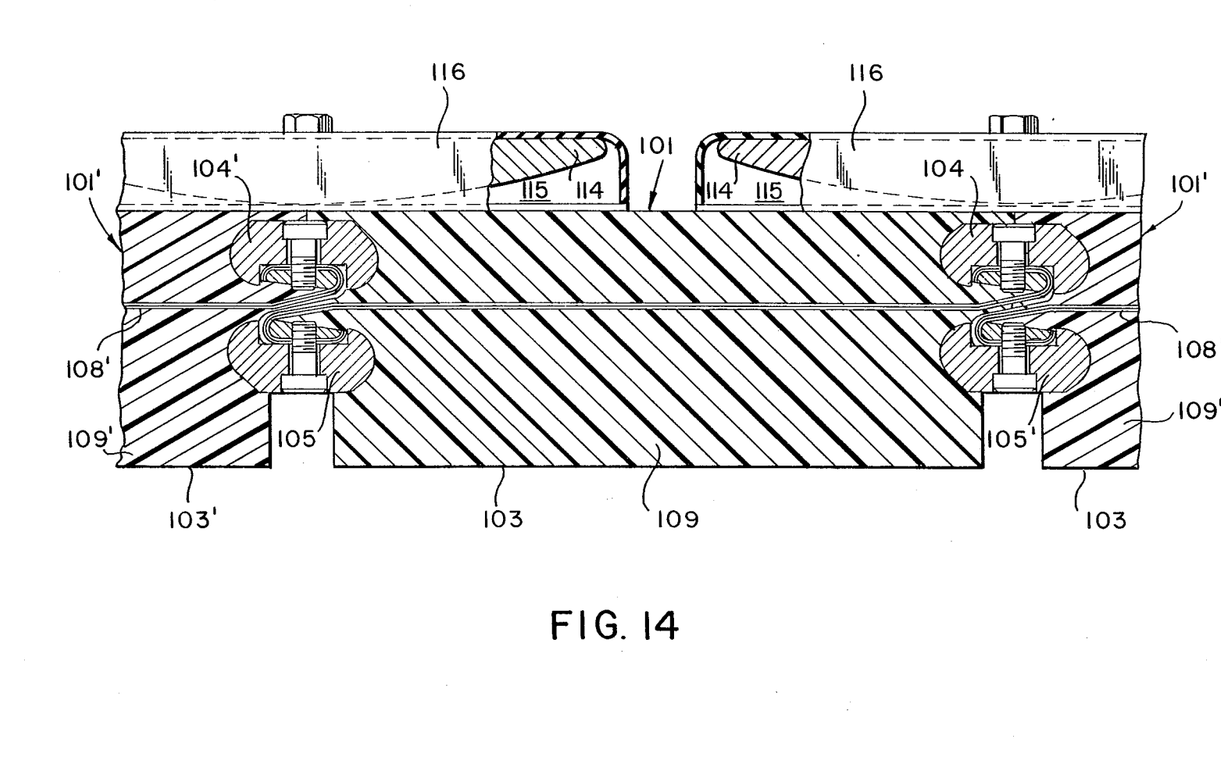
FIG. 14 shows a longitudinal section through the chain link element with support pieces according to section line III—III in FIG. 15.

FIG. 14 shows a chain link element according to FIG. 12 with disk segment 113 support pieces arranged in the edge regions. The disk segments exhibit a curved contact or roll surface 114 with a radius of curvature which is smaller than or equal to the radius of the track rollers (not shown). The roll surface 114 and the inner running surface 102 define a gap 115. The gap 115 is covered by a rubber cover 116 for preventing entry of dirt between the roll surface and the inner running surface.

Figure 15:
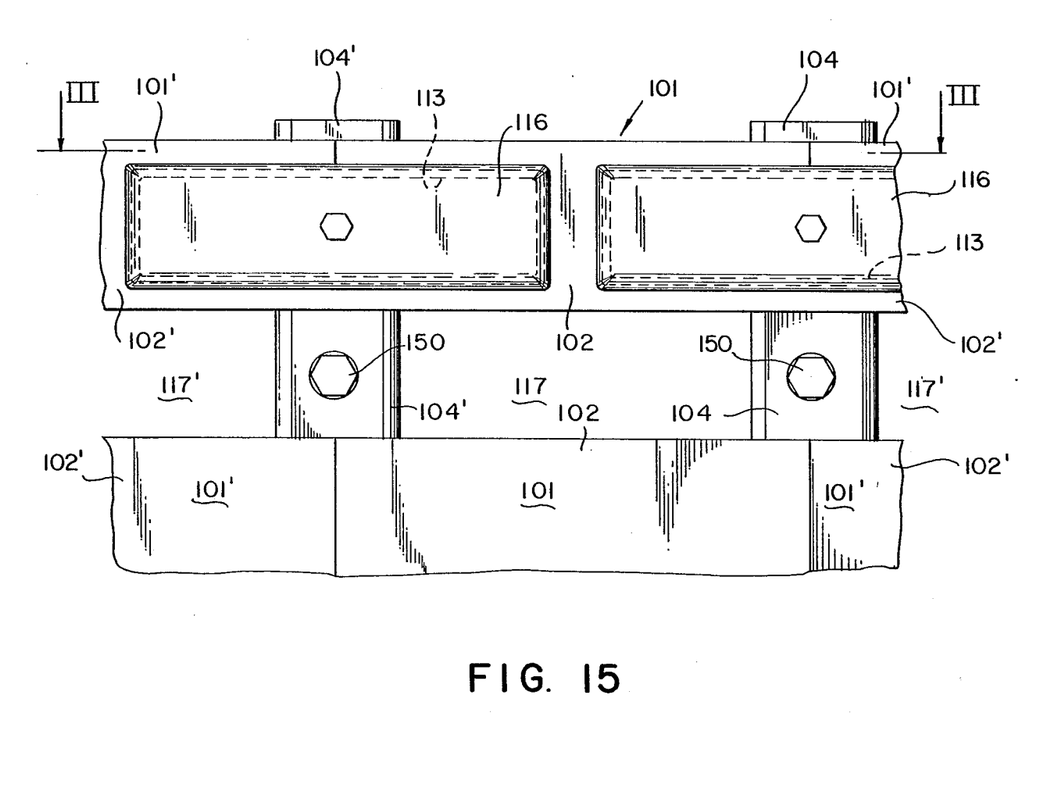
FIG. 15 shows the top view on part of the chain link element according to FIG. 14.

FIG. 15 shows a top view of the disk segments 113 covered with the rubber covers 116. Chain link elements 101 and 101', respectively, exhibit openings 117 and 117', respectively, intended for passage and engagement of the teeth of the drive wheels (not shown) contacting the transverse webs 14 and 14', respectively. FIG. 15 shows only a portion of a chain link element 101 and 101', respectively. The links have a wide central shear field support surrounded by elastomeric material, and two narrower lateral shear field supports which leave respective apertures for the teeth of the drive sprockets. The two narrower shear field supports are also surrounded by elastomeric material. These narrow shear field supports are given support by the disk segments 113 when traversing rock pieces and the like. The transverse webs 104 and 104', respectively, have inwardly directed chain guide teeth (not shown) in the central region. Counter-sunk bolts 150 may be used to fasten transverse webs of adjacent chain links.

Figure 16:
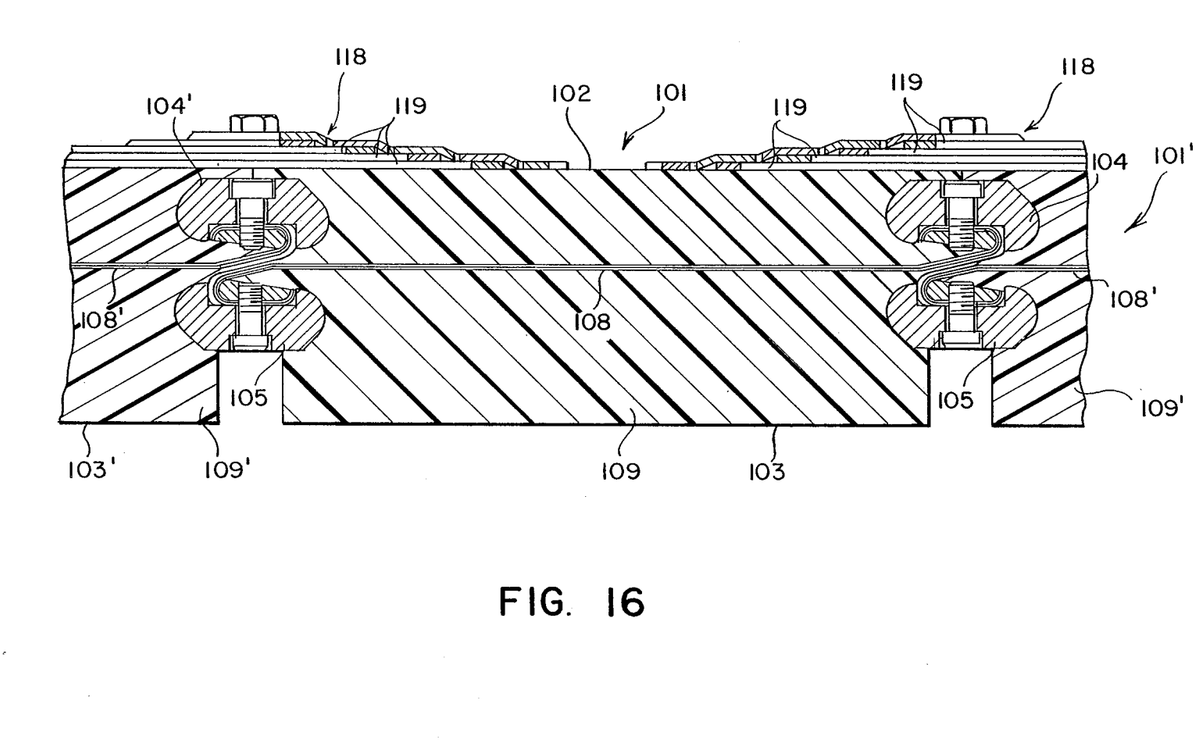
FIG. 16 shows a longitudinal section through the chain link element with a support piece.

FIG. 16 shows a chain link element according to FIG. 12 with support pieces configured as leaf spring packs 118 secured at the edge portions at the transverse webs 104 and 104', respectively. the individual leaf springs 119 of the packs exhibit a shortened length to provide steps in the direction away from the inner running surface 102. The width of the leaf springs is approximately that of the disk segments 113 shown in FIG. 15.

Figure 17:
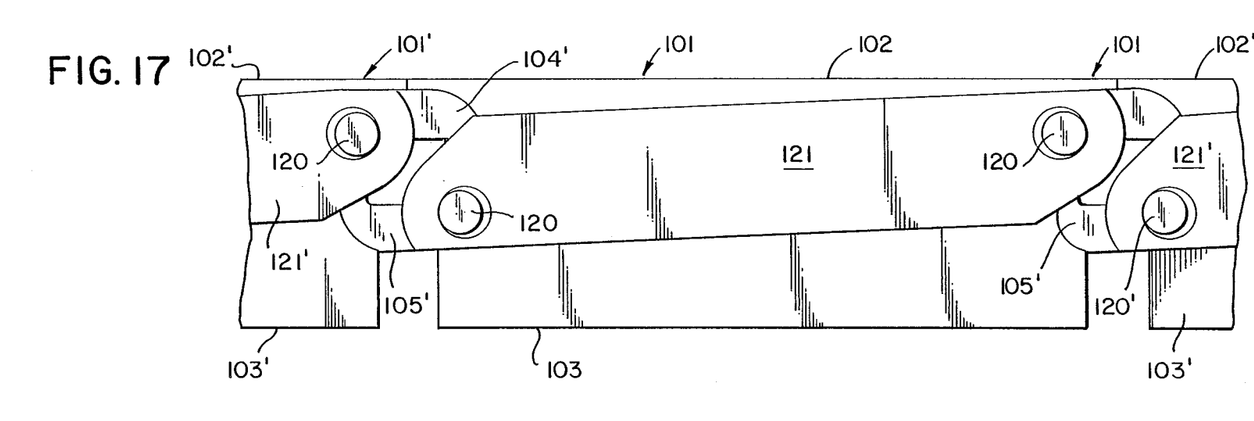
FIG. 17 shows the side elevation of a chain link element which is equipped with a protection tie.
Figure 18:
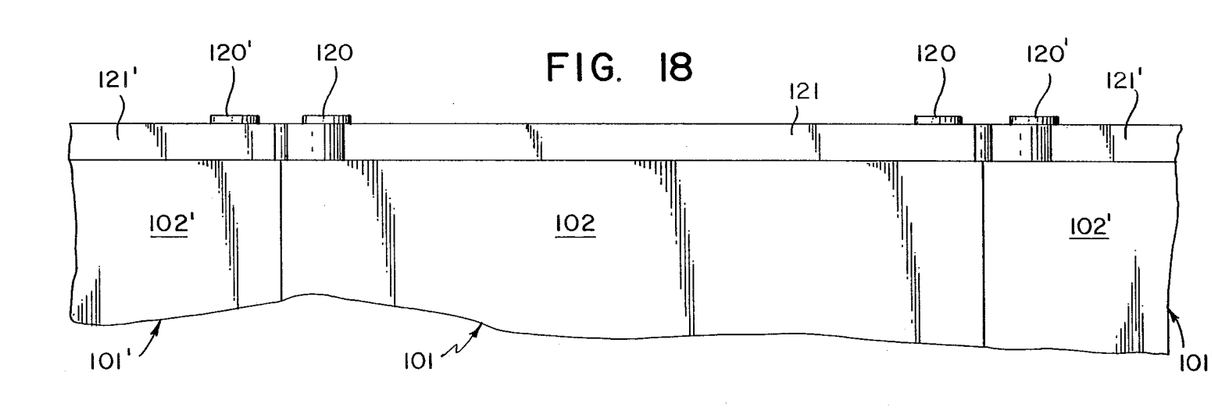
FIG. 18 shows a top view on the portion of the chain link element according to FIG. 17.

In FIGS. 17 and 18 a chain link element is shown generally corresponding to the embodiment shown in FIG. 12 with bolt-like extensions 120 and 120', respectively, at the transverse webs 104 and 105, as well as 104' and 105', respectively. The bolt-like extensions extend beyond the edge region of the chain. Protection ties 121 and 121' are secured to the extensions which cover the chain link element 101 and 101', respectively, on both sides. The chain link element is thus protected against damage from sharp rock pieces and the like acting laterally against the edge zones of the chain.

I claim:
1. A chain track comprising:
a plurality of adjoining chain links made of an elastomeric material;
means for reinforcing said chain links extending from a first end of each link adjacent to a previous link, to a second opposing end of said chain link adjacent to a subsequent link, said means for reinforcing is a shear field support made up of a flexible high tensile material exhibiting a high shear strength mounted in a substantially horizontal plane and embedded in said elastomeric material;

first means for positively connecting said means for reinforcing of a first chain link to means for reinforcing a second adjacent chain link.

2. A chain track according to claim 1 wherein said shear field support is radially bending high strength steel elements.

3. A chain track according to claim 2 wherein said shear field support comprises a plurality of layers of thin steel foils.

4. A chain track according to claim 2 wherein said first means for positively connecting comprises a direct bolted connection between shear field supports of adjacent chain links.

5. A chain track according to claim 2 wherein said first and said second opposing ends of each chain link exhibit a transverse web; and second means for connecting said transverse web to said shear field support.

6. A chain track according to claim 5 wherein said first means for positively connecting comprises means for connecting transverse webs of adjacent chain links.

7. A chain track according to claim 5 wherein said second means for connecting comprises:

a clamping bar and means for connecting said clamping bar to said transverse web;

wherein an end of said shear field support is arranged between said clamping bar and said transverse web.

8. A chain track according to claim 7 wherein said first means for positively connecting comprises means for connecting transverse webs of adjacent chain links.

9. A chain track according to claim 8 wherein said chain links are configured so that adjacent chain links overhang each other and transverse webs of adjacent chain links are arranged in a congruent vertical plane.

10. A chain track according to claim 9 wherein a portion of said shear field support extends in a first direction past said clamping bar and subsequently in an opposite second direction between said clamping bar and said transverse web, in a partially encompassing relationship with said clamping bar.

11. A chain track according to claim 10 further comprising an elastomeric material filled gap defined between said portion of said shear field support extending in said first direction and said clamping bar.

12. A chain track according to claim 11, wherein said gap is defined by an outer side of the clamping bar and said shear field support, said gap narrows toward an adjacent chain link.

13. A chain track according to claim 11, wherein said shear field support exhibits a layer of elastomeric material on a side opposing said clamping bar.

14. A chain track according to claim 11, wherein the shear field supports of adjacent chain links at the connection points are guided with oppositely arranged incline in said gaps of adjacent links.

15. A chain track according to claim 11, further comprising support element means for preventing collapse of a chain link secured at the connection points of adjacent chain links at two outer edge zones of an inner running surface for chassis wheels.

16. A chain track according to claim 15, wherein said support element means comprises a disk segment, centrally secured at said transverse webs, exhibiting a curved contact roll surface directed towards said inner running surface, wherein said curved contact roll surface exhibits a radius of curvature which is smaller than or equal to a radius of the chassis wheels.

17. A chain track according to claim 16, further comprising a rubber cover for covering a gap defined between said inner running surface and the curved roll surface of the disk segment.

18. A chain track according to claim 15, wherein said support element means comprises a leaf spring secured at the transverse webs and contacting the inner running surface.

19. A chain track according to claim 18, further comprising a plurality of progressively shorter leaf springs secured at said transverse web.

20. A chain track according to claim 11 further comprising bolt-like extensions connected to said transverse webs which extend over a lateral edge of the chain link element; and means for protecting a lateral edge of a chain link secured to respective bolt-like extension of a chain link.

21. A chain track as in claim 2, wherein the chain links further comprise a plurality of orifice means for the engagement of teeth of a drive gear, and wherein said shear field support means being provided in a peripheral area of the orifice means with corrugations extending in a longitudinal direction of the chain link.

22. A chain track as in claim 6, wherein said first means for positively connecting comprises clamping strip means for fastening the shear field support means to a transverse stud means of an adjoining chain link.

23. A chain track as in claim 22, wherein said transverse stud means at a first joint of the chain link is arranged above the shear field support and the transverse stud means at a second joint of the chain link is arranged under the shear field support.

24. A chain track as in claim 23, wherein said clamping strip means further comprises locking edges which engage locking edges of said transverse stud means of the adjoining chain links in a positive manner.

25. A chain track as in claim 24, further comprising:

push rod means penetrating a plane defined by the shear field support, hingedly attached to said transverse studs at the two joints of the chain link for preventing excessive buckling of said links in areas between said transverse stud means; and chain guide teeth connected to the chain link at said transverse stud means facing a bottom surface of said chain track.

26. A chain track as in claim 25, wherein said chain link further comprises orifice means for the engagement of teeth of a drive gear in an area between the transverse stud means of a chain link.

27. A chain track as in claim 8, wherein said chain link further comprises orifice means for the engagement of teeth of a drive gear in an area between the transverse stud means of a chain link.

28. A chain track as in claim 5, wherein said chain link further comprises orifice means for the engagement of teeth of a drive gear in an area between the transverse stud means of a chain link.

* * * * *